(12) United States Patent
Fukao

(10) Patent No.: US 8,397,601 B2
(45) Date of Patent: Mar. 19, 2013

(54) BICYCLE COMPONENT OPERATING DEVICE

(75) Inventor: Kazutaka Fukao, Sakai (JP)

(73) Assignee: Shimano Inc., Osaka (JP)

( * ) Notice: Subject to any disclaimer, the term of this patent is extended or adjusted under 35 U.S.C. 154(b) by 478 days.

(21) Appl. No.: 12/467,352

(22) Filed: May 18, 2009

(65) Prior Publication Data

US 2010/0288070 A1 Nov. 18, 2010

(51) Int. Cl.
*F16C 1/10* (2006.01)
*B62M 25/04* (2006.01)

(52) U.S. Cl. .................. 74/502.2; 74/489; 74/473.14

(58) Field of Classification Search .............. 74/502.2, 74/501.5 R, 500.5, 488, 489, 473.14, 473.15; F16C 1/10; B62M 25/00, 25/04
See application file for complete search history.

(56) References Cited

U.S. PATENT DOCUMENTS

| 3,972,247 | A | | 8/1976 | Armstrong | |
|---|---|---|---|---|---|
| 5,676,022 | A | * | 10/1997 | Ose | 74/502.2 |
| 5,957,002 | A | * | 9/1999 | Ueng | 74/502.2 |
| 7,194,928 | B2 | * | 3/2007 | Kawakami | 74/502.2 |
| 2006/0086198 | A1 | * | 4/2006 | Tsumiyama | 74/502.2 |
| 2007/0068318 | A1 | | 3/2007 | Jordan et al. | |

* cited by examiner

*Primary Examiner* — Richard W Ridley
*Assistant Examiner* — Daniel Yabut
(74) *Attorney, Agent, or Firm* — Global IP Counselors, LLP

(57) ABSTRACT

A bicycle component operating device is basically provided with a base member, an operating pawl, a positioning ratchet member, a positioning pawl, a release member and a control member. The operating pawl rotates the positioning ratchet member in a winding direction in response to a winding operation of the operating pawl. The positioning pawl prevents rotation of the positioning ratchet member in the release direction when the positioning pawl is in a holding position. The positioning pawl releases the positioning ratchet member for rotation in the release direction when the positioning pawl is moved from the holding position to a releasing position by the release member in response to the releasing operation of the operating pawl. The control member prevents the operating pawl from rotating the positioning ratchet member during the releasing operation of the operating pawl while the control member is disposed in the first position.

17 Claims, 15 Drawing Sheets

BICYCLE COMPONENT OPERATING DEVICE

BACKGROUND OF THE INVENTION

1. Field of the Invention

This invention generally relates to a bicycle component operating device for operating a bicycle component.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle.

One part of the bicycle that has been extensively redesigned is the bicycle transmission. Specifically, a bicycle transmission typically includes front and rear shift operating devices designed to operate front and rear derailleurs to move the derailleurs laterally over a plurality of sprockets or gears. The sprockets or gears are usually coupled to the front crank and the rear wheel such that a pedaling force from the rider is transferred to the rear wheel via the chain.

Generally speaking, a typical derailleur basically includes a base member, a pair of link members and a movable member with a chain guide. In the case of a rear derailleur, the chain guide is typically pivotally mounted to the movable member and includes a chain cage with a guide pulley and a tension pulley. In either case, the link members of the front or rear derailleur are pivotally coupled between the base member and the movable member to form a four bar parallelogram linkage. A shift cable is usually coupled between the base member and one of the link members to move the chain guide laterally with respect to the center plane of the bicycle. Thus, an inner wire of the cable is pulled to move the chain guide in a first lateral direction with respect to the center plane of the bicycle, and released to move the chain guide in a second lateral direction with respect to the center plane of the bicycle. Some cable operated shifters use one or more levers to rotate a wire takeup member for winding and releasing the inner wire that operates the derailleur. In many cases, the inner wire is wrapped or unwrapped about a peripheral edge of the wire takeup member.

SUMMARY OF THE INVENTION

One object of the present invention is to provide a bicycle component operating device that is relatively simple and easy to manufacture.

The foregoing object can basically be attained by providing a bicycle component operating device that comprises a base member, an operating pawl, a positioning ratchet member, a positioning pawl, a release member and a control member. The operating pawl is movably mounted with respect to the base member. The positioning ratchet member is rotatably mounted with respect to the base member about a pivot axis. The operating pawl engages and rotates the positioning ratchet member in a winding direction about the pivot axis in response to a winding operation of the operating pawl. The positioning pawl is movably mounted with respect to the base member between a holding position and a releasing position. The positioning pawl prevents rotation of the positioning ratchet member in a release direction about the pivot axis when the positioning pawl is in the holding position. The positioning pawl releases the positioning ratchet member for rotation in the release direction when the positioning pawl is in the releasing position. The release member is movably mounted with respect to the base member. The release member moves the positioning pawl from the holding position to the releasing position in response to the releasing operation of the operating pawl. The control member is movably mounted with respect to the base member between a first position and a second position. The control member operatively prevents the operating pawl from rotating the positioning ratchet member during the releasing operation of the operating pawl while the control member is disposed in the first position.

These and other objects, features, aspects and advantages of the present invention will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
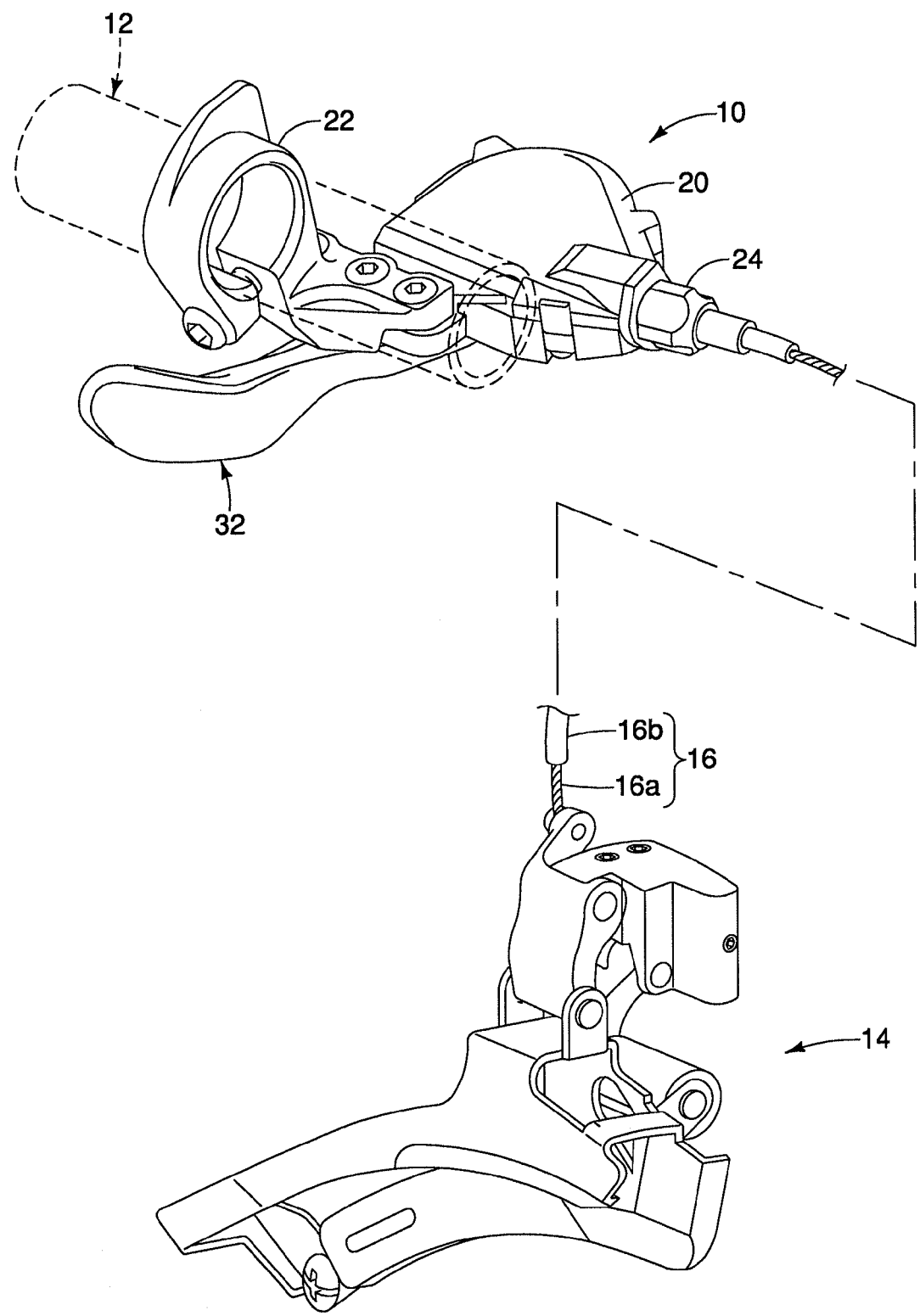
FIG. 1 is a perspective view of a bicycle component operating device in the form of a left hand shifter and a front derailleur operatively coupled to the shifter in accordance with one embodiment.

Referring initially to FIG. 1, a left hand shifter 10 is illustrated in accordance with one embodiment. In the illustrated embodiment, the shifter 10 is mounted on a bicycle handlebar 12, and is operatively coupled to a front derailleur 14 by a front shift operating cable 16. In the illustrated embodiment, the shifter 10 constitutes a bicycle component operating device that is preferably used for shifting gears of a bicycle that is equipped with a various conventional components, including, but not limited to the front derailleur 14. As seen in FIG. 1, the shifter 10 is a left hand side control device operated by the rider's left hand for shifting the front derailleur 14 via the front shift operating cable 16. Alternatively, the shifter 10 can be mounted on opposite side of the handlebar 12 as needed and/or desired. Of course, it will be apparent to those skilled in the art from this disclosure that the shifter 10 can be used to operate other bicycle components as needed and/or desired.

The shift operating cable 16 is a conventional Bowden cable. In particular, the shift operating cable 16 includes an inner wire 16a with an outer casing 16b covering the inner wire 16a. In the illustrated embodiment, the front derailleur 14 can be moved between a plurality of different gear positions by operation of the shifter 10, which selectively pulls or releases the inner wire 16a of the shift operating cable 16. The front derailleur 14 is a conventional derailleur, and thus, will not be discussed and/or illustrated in detail herein.

The shifter 10 will now be described in more detail. While the shifter 10 in the illustrated embodiment has only two shift positions, it will be apparent to those skilled in the art from this disclosure that the shifter 10 can be modified to have more than two shift positions, if needed and/or desired. Preferably, as seen in FIG. 1, the shifter 10 includes a housing 20 for covering the internal parts and a handlebar clamp 22 for securing the shifter 10 to the handlebar 12. The handlebar clamp 22 is preferably made of, for example, metal and configured to be fastened to the handlebar 12 by tightening a bolt. The housing 20 is preferably provided with a cable adjusting nut 24 for receiving the shift operating cable 16. The cable adjusting nut 24 is a conventional structure, and thus, it will not be discussed and/or illustrated in detail.

Referring now to FIGS. 2 to 9, the bicycle component operating device or shifter 10 basically includes a base member 30, a rider operating member 32, a positioning ratchet member 34, a wire takeup member 36, a positioning pawl 38, an operating pawl 40, a release member 42 and a control member 44. The wire takeup member 36 is coupled to the positioning ratchet member 34 so that the positioning ratchet member 34 and the wire takeup member 36 move together as a unit about a main pivot or rotational axis A in response to movement of the rider operating member 32 as explained below.

The housing 20 (FIG. 1) is secured to the base member 30 in a conventional manner (e.g. screwed, snap-fitted, etc.), with a rider operation portion of the rider operating member 32 projecting out of the housing 20. In the illustrated embodiment, the shifter 10 has two shift positions, with the rider operating member 32 being movably mounted with respect to the base member 30 to perform both an inner wire releasing operation that releases the inner wire 16a and an inner wire winding operation that pulls the inner wire 16a. The housing 20 can be constructed of a hard plastic or metal as needed and/or desired. The particular construction of the housing 20 is unimportant, and thus, will not be described and/or illustrated in detail herein.

As seen in FIGS. 2 to 9, the base member 30 basically includes a lower support plate 46, an upper support plate 48, a main support shaft 50 extending between the support plates 46 and 48, and a nut 52. The housing 20, the handlebar clamp 22 and the support plates 46 and 48 basically constitute a support or fixed member of the shifter 10. The support plates 46 and 48 are preferably rigid metal plates. The support plates 46 and 48 are secured together by the main support shaft 50, which is preferably a bolt with the nut 52 threaded on its upper end. The main support shaft or bolt 50 and the nut 52 also secures the rider operating member 32 to the base member 30 for pivotally movement of the rider operating member 32 with respect to the base member 30 as discussed below. The lower support plate 46 has a pivot hole 46a that receives a first portion of the main support shaft 50, while the upper support plate 48 has a pivot hole 48a that receives a second portion of the main support shaft 50.

A pivot pin 54 is fixed between the support plates 46 and 48. The pivot pin 54 pivotally supports the positioning pawl 38 between the support plates 46 and 48. The lower end of the pivot pin 54 extends through an opening 46b in the lower support plate 46, while the upper end of the pivot pin 54 extends through an opening 48b in the upper support plate 48. Each end of the pivot pin 54 has a groove for receiving a C-shaped retaining clip 56.

Preferably, the main support shaft 50 extends perpendicular to the support plates 46 and 48. The main support shaft 50 defines the main pivot or rotational axis A of the rider operating member 32, the positioning ratchet member 34, the release member 42 and the control member 44. In other words, the rider operating member 32, the positioning ratchet member 34, the release member 42 and the control member 44 are all movably (pivotally) mounted with respect to the base member 30 on a single coincident axis corresponding to the pivot axis A. The main support shaft 50 has an abutment flange 50a at one end that contacts the top surface of the upper support plate 48. The upper support plate 48 has two tabs 48c that contact flat edges of the abutment flange 50a to prevent rotation of the main support shaft 50 with respect to the upper support plate 48. The main support shaft 50 also has a large diameter section 50b and a smaller diameter section 50c, with an annular abutment 50d formed between the large diameter section 50b and the smaller diameter section 50c. The large diameter section 50b is disposed within the pivot hole 48a of the upper support plate 48, while the smaller diameter section 50c is disposed within the pivot hole 46a of the lower support plate 46. The annular abutment 50d contacts the upper facing surface of the lower support plate 46. The smaller diameter section 50c is preferably threaded for threadedly receiving the nut 52.

Figure 8:
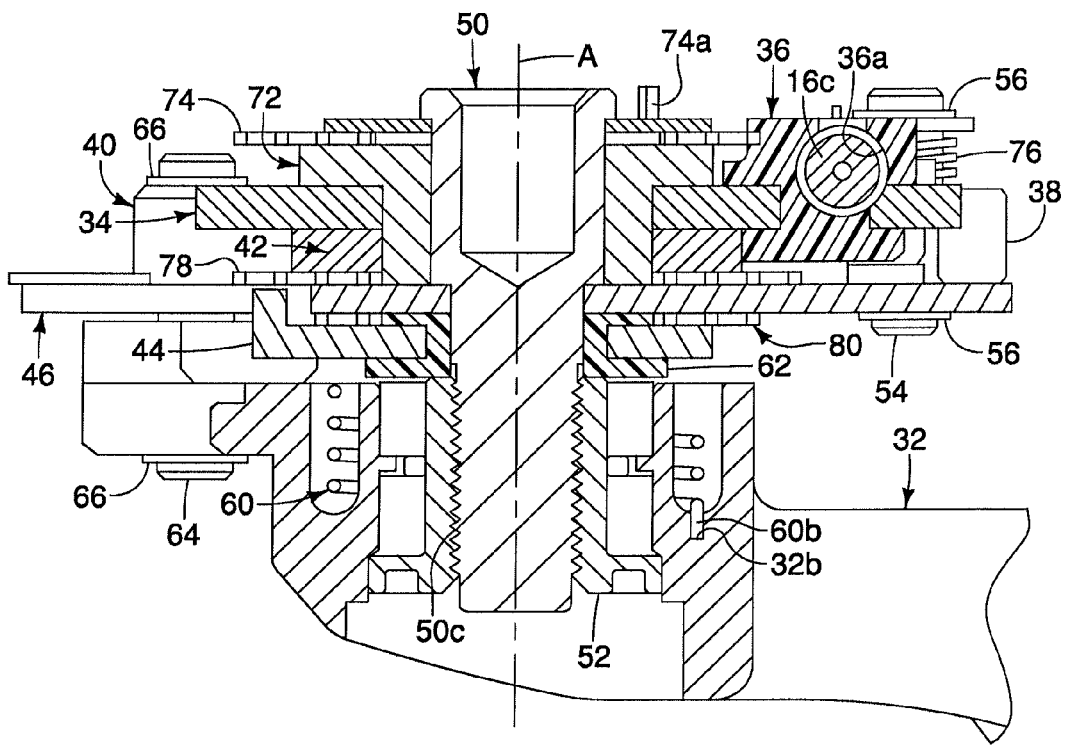
FIG. 8 is a cross-sectional view of selected parts of the shifter illustrated in FIGS. 1 to 7 with the rider operating member or lever in a rest position.
Figure 9:
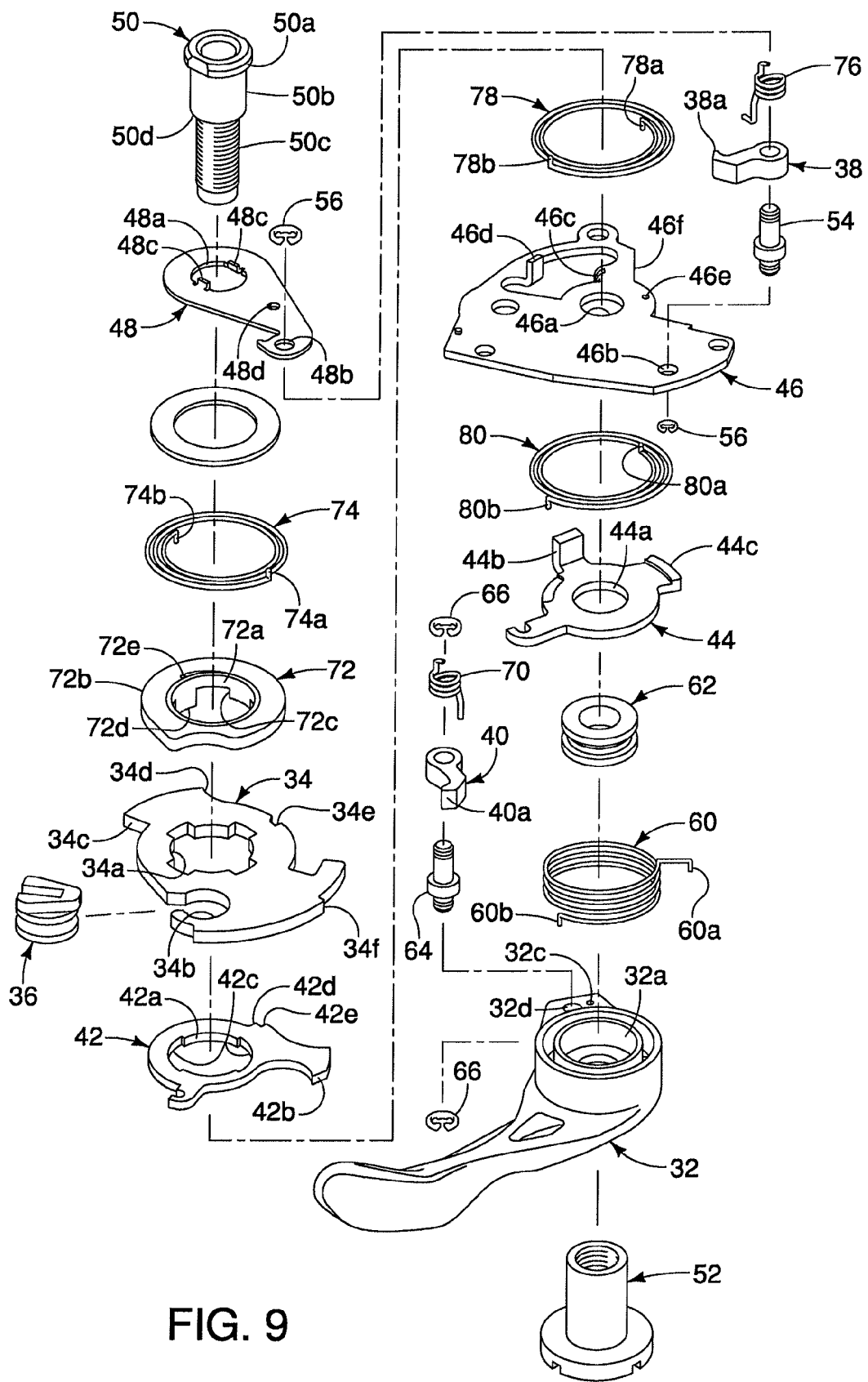
FIG. 9 is an exploded perspective view of selected parts selected parts of the shifter illustrated in FIGS. 1 to 8 with the rider operating member or lever in a rest position.

Turning now to the structure of the rider operating member 32, which is movably mounted with respect to the base member 30. As seen in FIGS. 8 and 9, preferably, the rider operating member 32 has a main mounting hole 32a at its inner end that receives the smaller diameter section 50c of the main support shaft 50. Thus, the rider operating member 32 is pivotally mounted on the main support shaft 50 that defines the pivot axis A of the positioning ratchet member 34. The rider operating member 32 is pivoted with respect to the base member 30 to move in a first rotational direction R1 (i.e., an inner wire winding direction) to perform both the inner wire winding operation and the inner wire releasing operation, as explained below.

Figure 12:
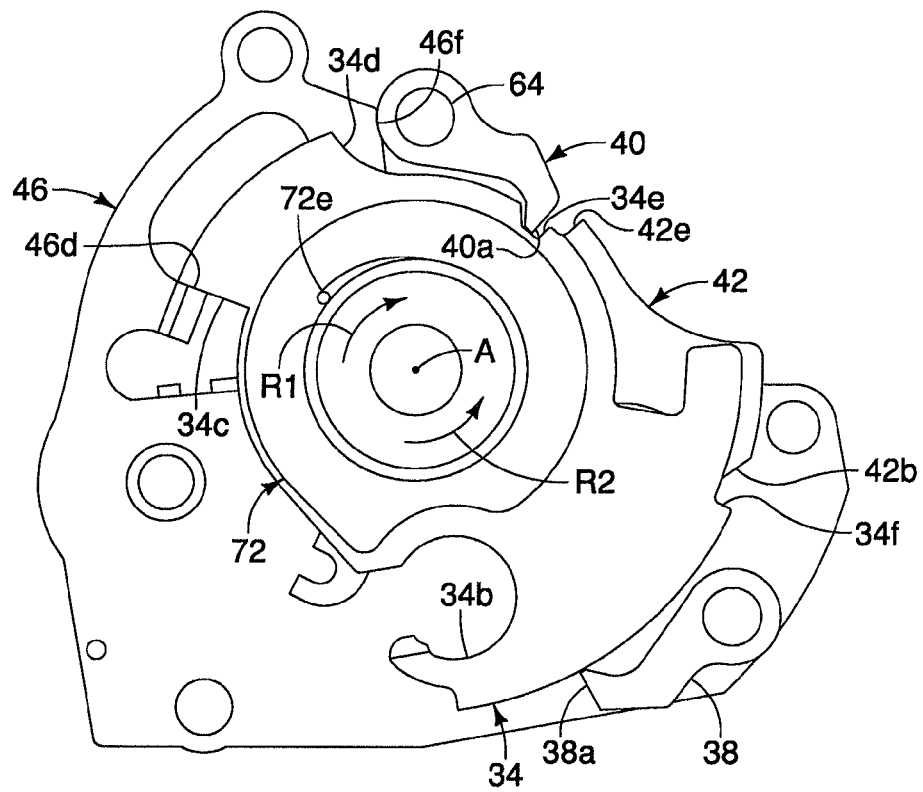
FIG. 12 is a top plan view of selected parts of the shifter illustrating the positioning ratchet member in the first shift position.
Figure 13:
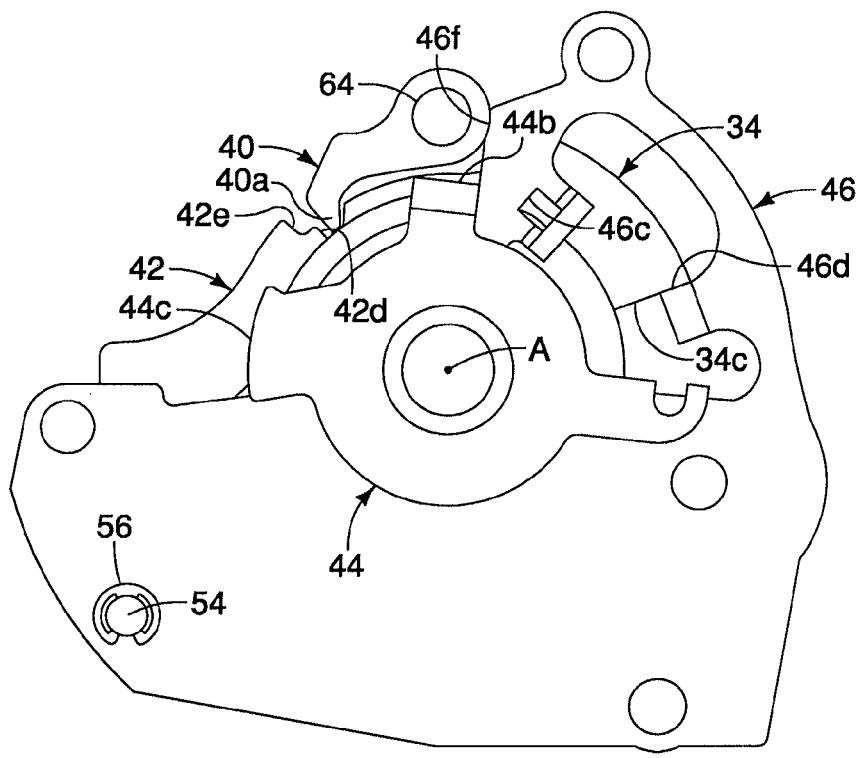
FIG. 13 is a bottom plan view of selected parts of the shifter illustrating the positioning ratchet member in the first shift position.

In this embodiment, the rider operating member 32 is preferably a trigger type lever that is biased in a second rotational direction R2 (i.e., an inner wire releasing direction) by a return spring 60. In particular, the rider operating member 32 is a single trigger lever that is biased to either a first rest position, as seen in step A of FIG. 10, or a second rest position, as seen in step A of FIG. 11. The first rest position of the rider operating member 32 corresponds to when the positioning ratchet member 34 of the shifter 10 is in the first shift position, as seen in FIG. 12. The second rest position of the rider operating member 32 corresponds to when the positioning ratchet member 34 of the shifter 10 is in the second shift position, as seen in FIG. 13. The second shift position and the second rest position are angularly spaced from the first shift position and the first rest position about the pivot axis A, respectively. The return spring 60 is a torsion spring that constitutes a biasing element. The return spring 60 is operatively coupled between the rider operating member 32 and the lower support plate 46 to bias the rider operating member 32 in the second rotational direction R2. The return spring 60 has a first end 60a disposed in a hole 46c of the lower support plate 46 and a second end 60b disposed in a hole 32b (shown in FIG. 8) in the rider operating member 32. Thus, the return spring 60 biases the rider operating member 32 towards the rest positions (FIGS. 12 and 13). A washer 62 is provided on the lower facing surface of the lower support plate 46 to prevent the return spring 60 from being squeezed between the rider operating member 32 and the lower support plate 46 when the main support shaft 50 and the nut 52 are tighten.

The rider operating member 32 also has a hole 32d that receives a pivot pin 64. The pivot pin 64 pivotally supports the operating pawl 40 thereon. In other words, the operating pawl 40 is mounted on the rider operating member 32 to move therewith. In particular, each end of the pivot pin 64 has a groove that receives a clip 66 for fixedly attaching the pivot pin 64 to the rider operating member 32 and for retaining the operating pawl 40 on the pivot pin 64. Alternatively, the pivot pin 64 can be attached to the rider operating member 32 in other ways such as riveting or a press fitting. A return spring 70 is provided to bias the operating pawl 40 towards engagement with the edge of the positioning ratchet member 34. The return spring 70 has a coiled portion mounted on the pivot pin 64. A first leg portion 70a of the return spring 70 is engaged in a hole 32c in the rider operating member 32. A second leg portion 70b of the return spring 70 is engaged with the operating pawl 40. Thus, the return spring 70 constitutes a biasing element for the operating pawl 40.

Figure 10:
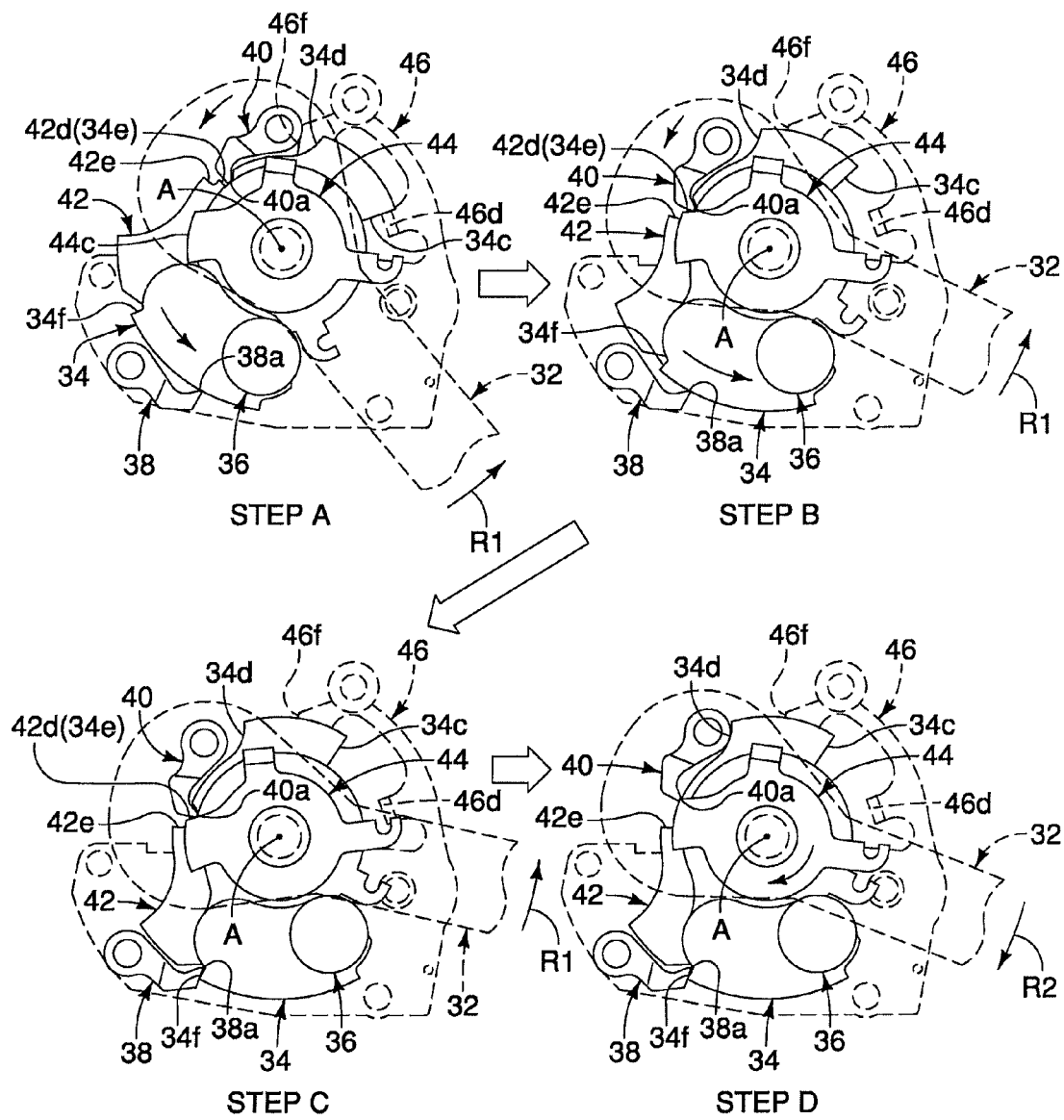
FIG. 10 is a sequence of bottom plan views of selected parts of the shifter illustrating an inner wire winding operation in which the positioning ratchet member moves from the first shift position to the second shift position.
Figure 11:
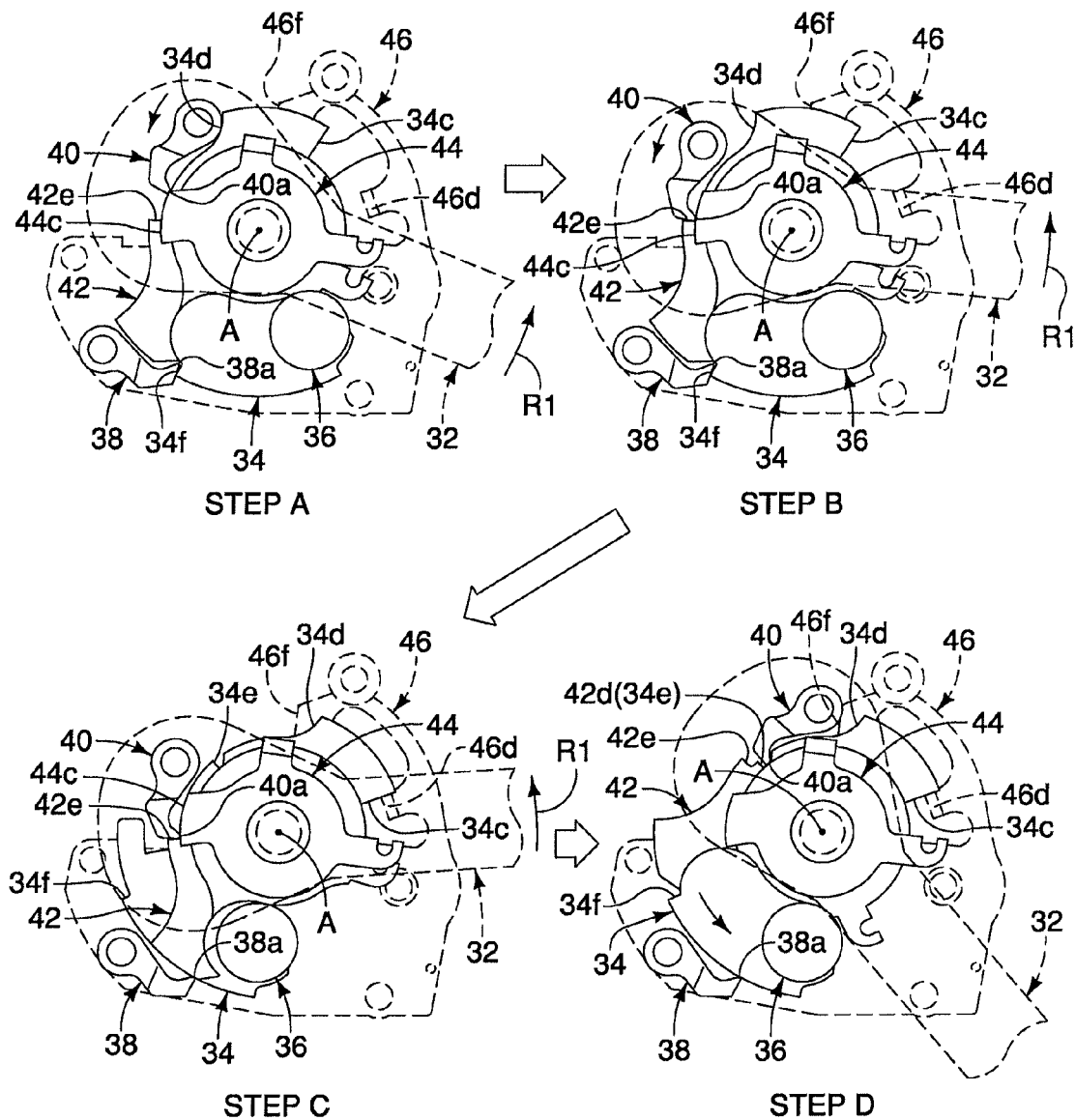
FIG. 11 is a sequence of bottom plan views of selected parts of the shifter illustrating an inner wire releasing operation in which the positioning ratchet member moves from the second shift position to the first shift position.

When the rider operating member 32 is in the first rest position, as seen in step A of FIG. 10 and step D of FIG. 11, the positioning ratchet member 34 is in the first shift position with the positioning pawl 38 engaged with the positioning ratchet member 34. However, when the rider operating member 32 is pivoted in the first rotational direction R1 from the first rest position, as seen in the steps B and C of FIG. 10, the operating pawl 40 rotates the positioning ratchet member 34 about the pivot axis A in the first rotational direction R1. Since the wire takeup member 36 is attached to the positioning ratchet member 34, the wire takeup member 36 rotates with the positioning ratchet member 34 as the rider operating member 32 is pivoted in the first rotational direction R1 from the first rest position (step A of FIG. 10) towards the second rest position (steps B and C of FIG. 10).

Referring to FIG. 10, an inner wire winding operation is illustrated. As the rider operating member 32 is pivoted in the first rotational direction R1 from the first rest position, the operating pawl 40 rotates positioning ratchet member 34. Since the wire takeup member 36 is attached to the positioning ratchet member 34, the rotation of the positioning ratchet member 34 in the first rotational direction R1 pulls the inner wire 16a. When the rider operating member 32 reaches an end stroke position of the rider operating member 32, as seen in step C, the positioning pawl 38 moves radially inward with respect to the pivot axis A to latch on the positioning ratchet member 34. Once the positioning pawl 38 latches on the positioning ratchet member 34, the positioning ratchet member 34 is prevented from rotation in the second rotational direction R2, which is opposite the first rotational direction R1. Thus, the rider operating member 32 is movably mounted with respect to the base member 30 in the winding direction from the rest position to an operating position (i.e., where the positioning pawl 38 latches on the positioning ratchet member 34) in a single progressive stroke.

Since the rider operating member 32 is biased in the second rotational direction R2 (i.e., trigger type lever), the rider operating member 32 and the operating pawl 40 both move to the second rest position (step D of FIG. 10 and step A of FIG. 11) once the rider operating member 32 is released after an inner wire winding operation. Now, when the rider operating member 32 is released after performing this inner wire winding operation, the rider operating member 32 returns to the second rest position, with the operating pawl 40 contacting the peripheral edge of the positioning ratchet member 34 to stop further rotation of the rider operating member 32 in the second rotational direction R2. Also when the rider operating member 32 is released after an inner wire winding operation, the operating pawl 40 contacts a peripheral edge of the control member 44 so that the operating pawl 40 does not engage the positioning ratchet member 34. In other words, in this second rest position, when the rider operating member 32 is pivoted in the first rotational direction R1 from the second rest position to perform an inner wire releasing operation, the control member 44 prevents the operating pawl 40 from rotating the positioning ratchet member 34.

Referring to FIG. 11, an inner wire releasing operation is illustrated. Here, in FIG. 11, the rider operating member 32 is in the second rest position (step A of FIG. 11) with the positioning ratchet member 34 in the second shift position. Thus, with the positioning ratchet member 34 in the second shift position, the positioning pawl 38 is disposed in radially inward with respect to the pivot axis A as compared to when the positioning ratchet member 34 is in the first shift position. As seen in steps B and C of FIG. 11, the rider operating member 32 is pivoted in the first rotational direction R1 from the second rest position, the operating pawl 40 engages the release member 42 after a small amount of initial rotation in the first rotational direction R1 from the second rest position. Once the operating pawl 40 engages the release member 42, the rider operating member 32 and the release member 42 rotate together. When the rider operating member 32 reaches the end stroke position from the second rest position, the release member 42 rotates the positioning pawl 38 out of engagement from the positioning ratchet member 34. When the positioning pawl 38 is disengaged or unlatched from the positioning ratchet member 34, the positioning ratchet member 34 returns to the first rest position, as seen in step D of FIG. 11. In other words, this disengaging or unlatching of the positioning pawl 38 from the positioning ratchet member 34 results in the positioning ratchet member 34 rotating from the second shift position to the first shift position. Now, when the rider operating member 32 is released after performing this inner wire releasing operation, the positioning ratchet member 34 returns to the first shift position and contacts an abutment 46d of the lower support plate 46 for preventing further rotation of the positioning ratchet member 34 in the second rotational direction R2. Also when the rider operating member 32 returns to the first rest position, the operating pawl 40 contacts the peripheral edge of the positioning ratchet member 34 to stop further rotation of the rider operating member 32 in the second rotational direction R2.

Turning now to the structure of the positioning ratchet member 34. The positioning ratchet member 34 is a flat, rigid plate that is made of a suitable material such as metal. In the illustrated embodiment, the positioning ratchet member 34 includes a mounting hole 34a, a cutout 34b, a first rotational stop 34c, a second rotational stop 34d, an operating pawl abutment 34e and a positioning pawl abutment 34f. The mounting hole 34a receives the main support shaft 50 therethrough. In particular, the positioning ratchet member 34 is rotatably mounted on the main support shaft 50 by a spring retainer 72, which is a tubular member. In other words, the positioning ratchet member 34 is rotatably mounted with respect to the base member 30 about the pivot axis A.

Figure 16:
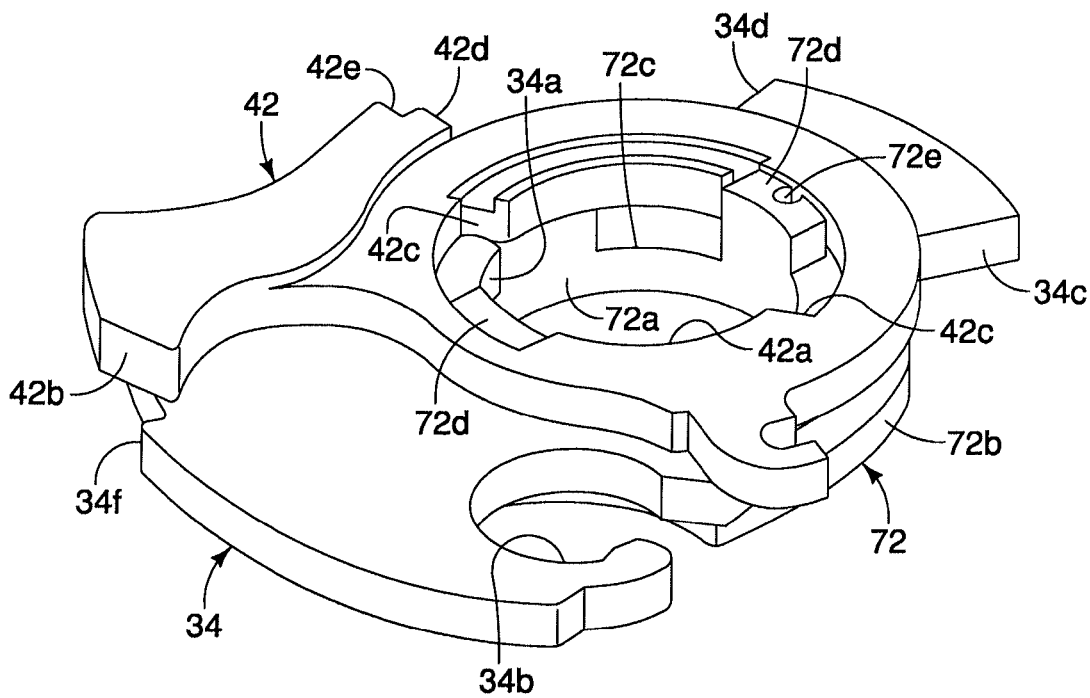
FIG. 16 is a bottom perspective view of the release member, the positioning ratchet member and the spring retainer, all in the rest position with respect to each other.
Figure 17:
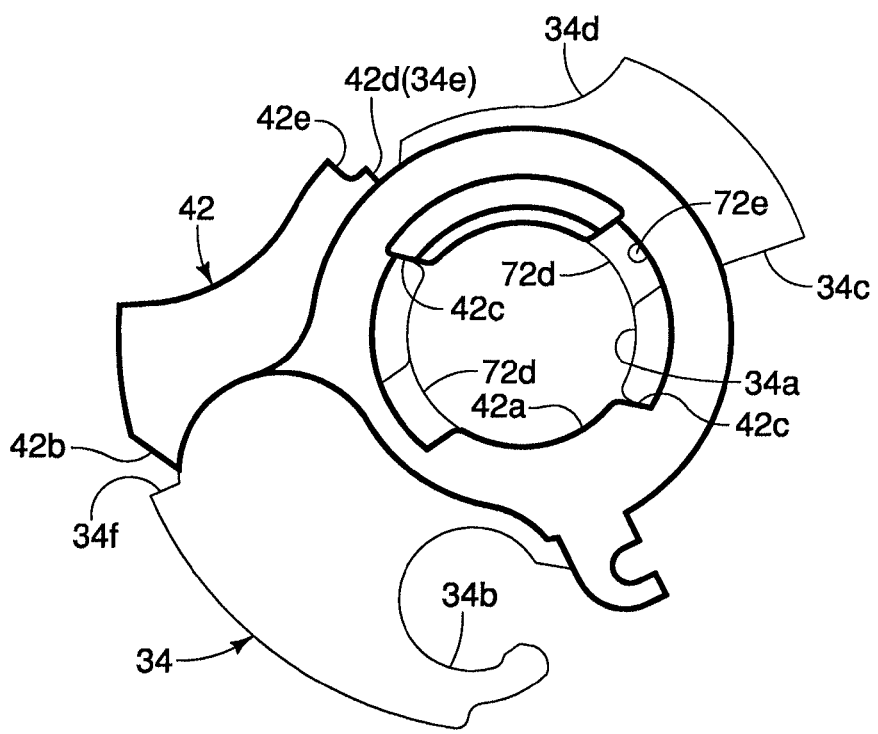
FIG. 17 is a bottom plan view of the release member, the positioning ratchet member and the spring retainer, all in the rest position with respect to each other.
Figure 18:
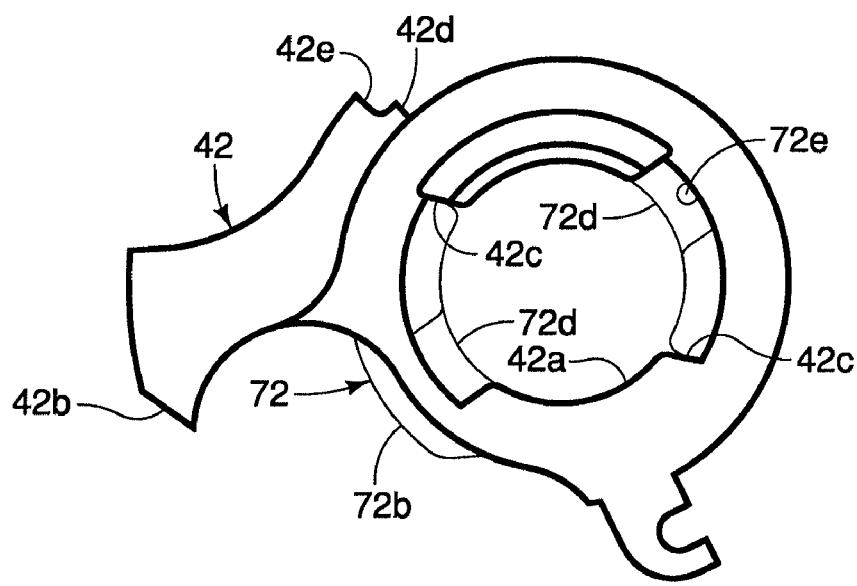
FIG. 18 is a bottom plan view of the release member and the spring retainer, with the release member and the spring retainer both in the rest position with respect to each other.
Figure 19:
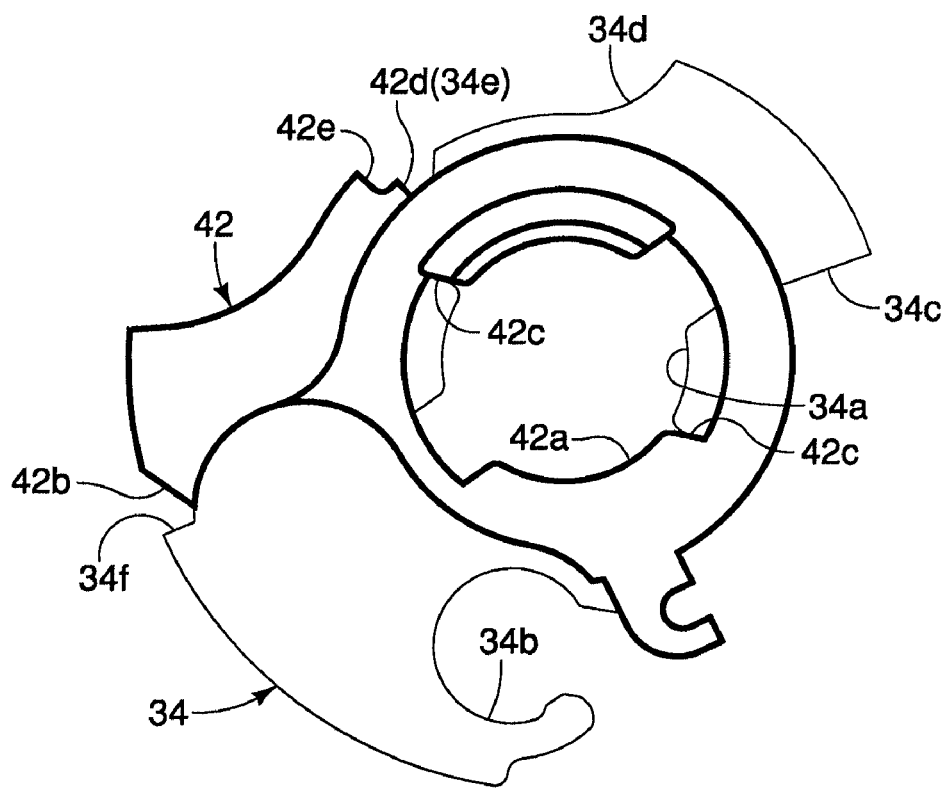
FIG. 19 is a bottom plan view of the release member and the positioning ratchet member, with the release member and the positioning ratchet member both in the rest position with respect to each other.
Figure 20:
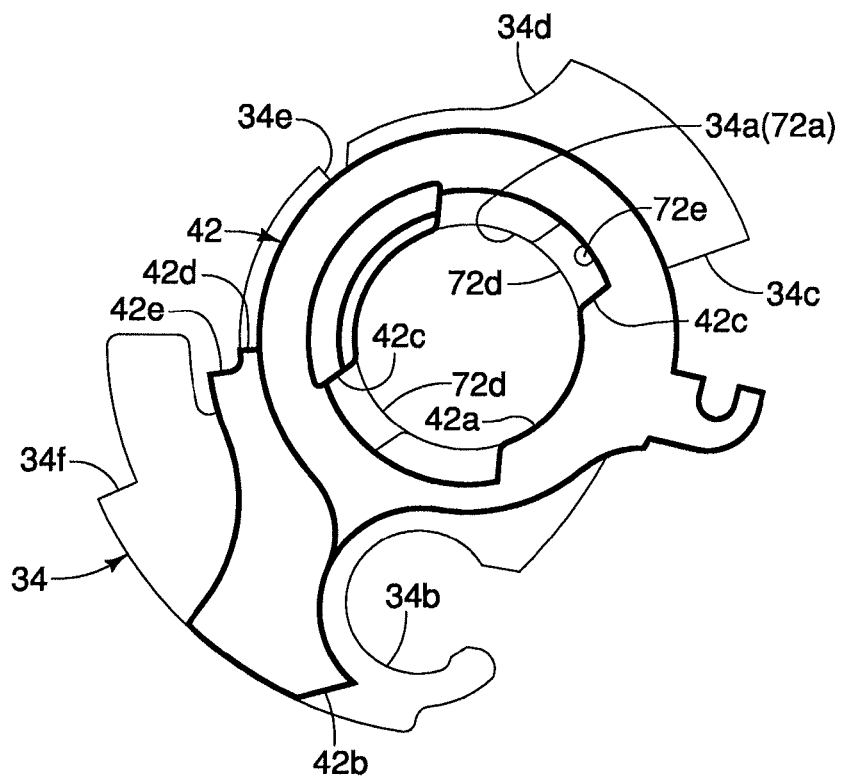
FIG. 20 is a bottom plan view of the release member, the positioning ratchet member and the spring retainer, with the release member rotated to the releasing position with respect to the positioning ratchet member and the spring retainer.
Figure 21:
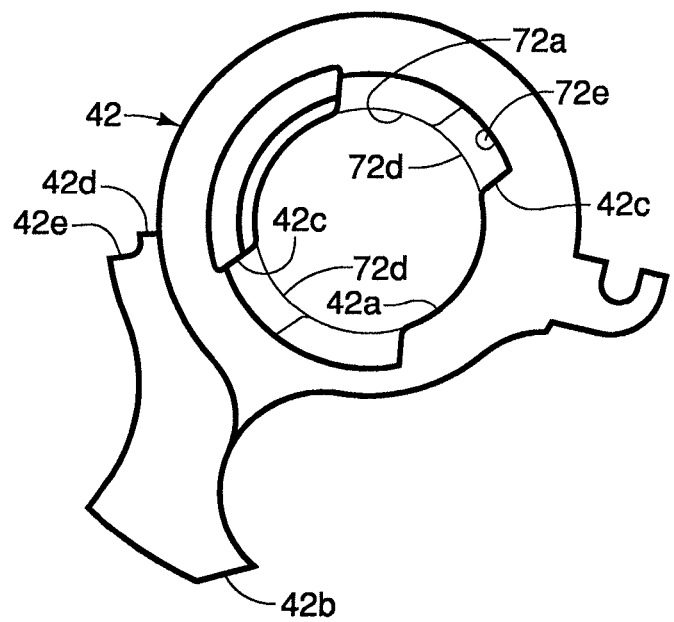
FIG. 21 is a bottom plan view of the release member and the spring retainer, with the release member rotated to the releasing position with respect to the spring retainer.
Figure 22:
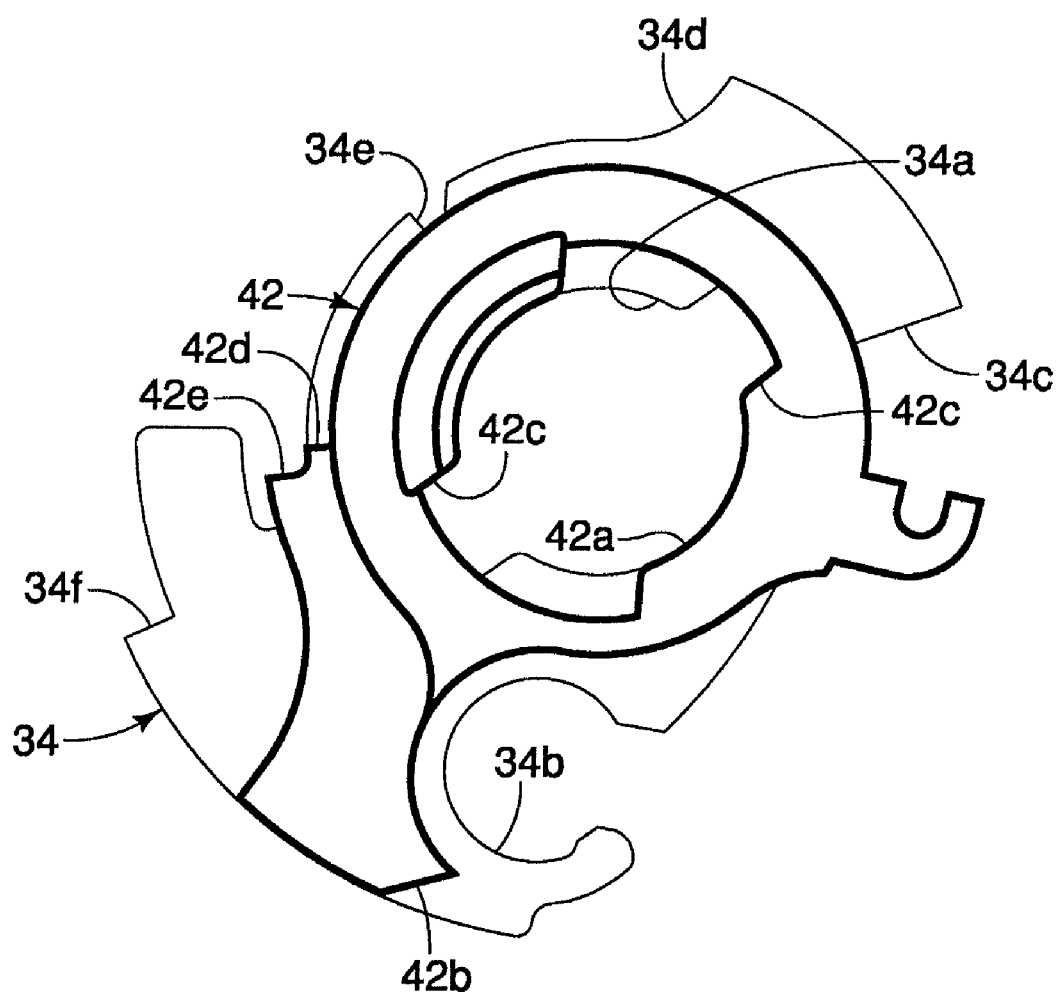
FIG. 22 is a bottom plan view of the release member and the positioning ratchet member, with the release member rotated to the releasing position with respect to the positioning ratchet member.

As best seen in FIGS. 9, 16 and 17, the spring retainer 72 has a cylinder part 72a with an annular flange part 72b at one end of the cylinder part 72a. The cylinder part 72a has four notches 72c and two abutments 72d. The mounting hole 34a of the positioning ratchet member 34 has four projections that mates with the four notches 72c of the spring retainer 72 so that the positioning ratchet member 34 and the spring retainer 72 move together as a unit. The abutments 72d of the spring retainer 72 engage the release member 42, as discussed below, such that the release member 42 can rotate relative to the positioning ratchet member 34 for a predetermined amount of rotational movement (see, FIGS. 16 to 22).

Preferably, the positioning ratchet member 34 is biased in the second rotational direction R2 by a flat coil spring 74 that is operatively disposed between the spring retainer 72 and the upper support plate 48. The flat coil spring 74 constitutes a biasing element of the positioning ratchet member 34 for urging the positioning ratchet member 34 in the second rotational direction R2. The wire takeup member 36 is mounted in the cutout 34b of the positioning ratchet member 34. The cutout 34b of the positioning ratchet member 34 constitutes an inner wire connection structure. Since the positioning ratchet member 34 and the wire takeup member 36 are coupled together to rotate as a unit, the biasing force of the flat coil spring 74 is transmitted from the positioning ratchet member 34 to the wire takeup member 36. The flat coil spring 74 has a first end 74a disposed in a hole 48d in the upper support plate 48 and a second end 74b disposed in a hole 72e in the spring retainer 72. The flat coil spring 74 is preloaded to urge the positioning ratchet member 34 and the wire takeup member 36 in the second rotational direction R2.

Figure 14:
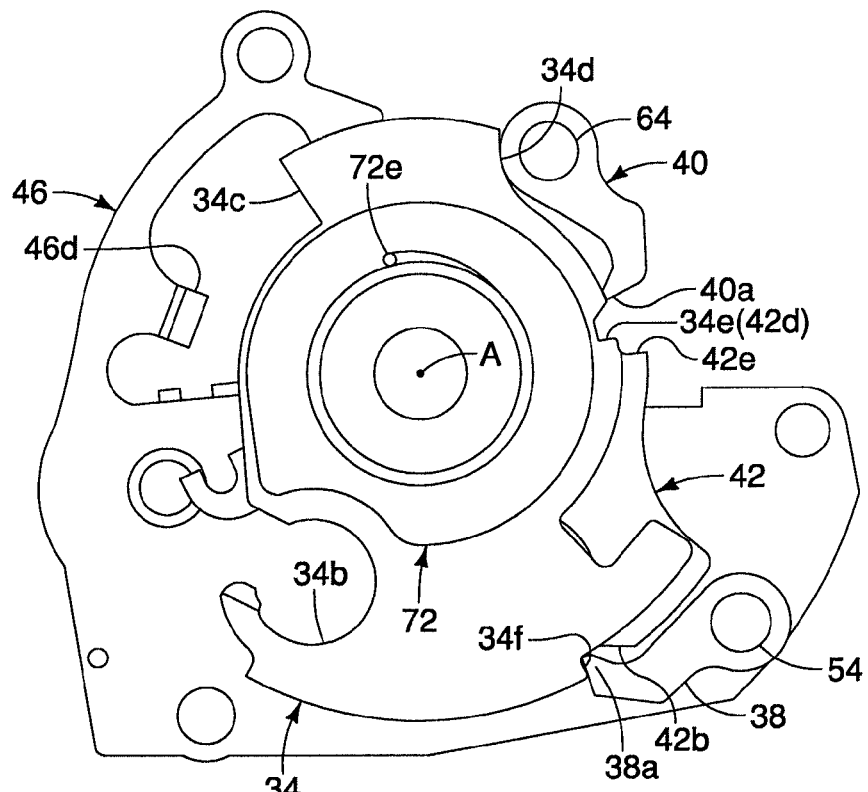
FIG. 14 is a top plan view of selected parts of the shifter illustrating the positioning ratchet member in the second shift position.
Figure 15:
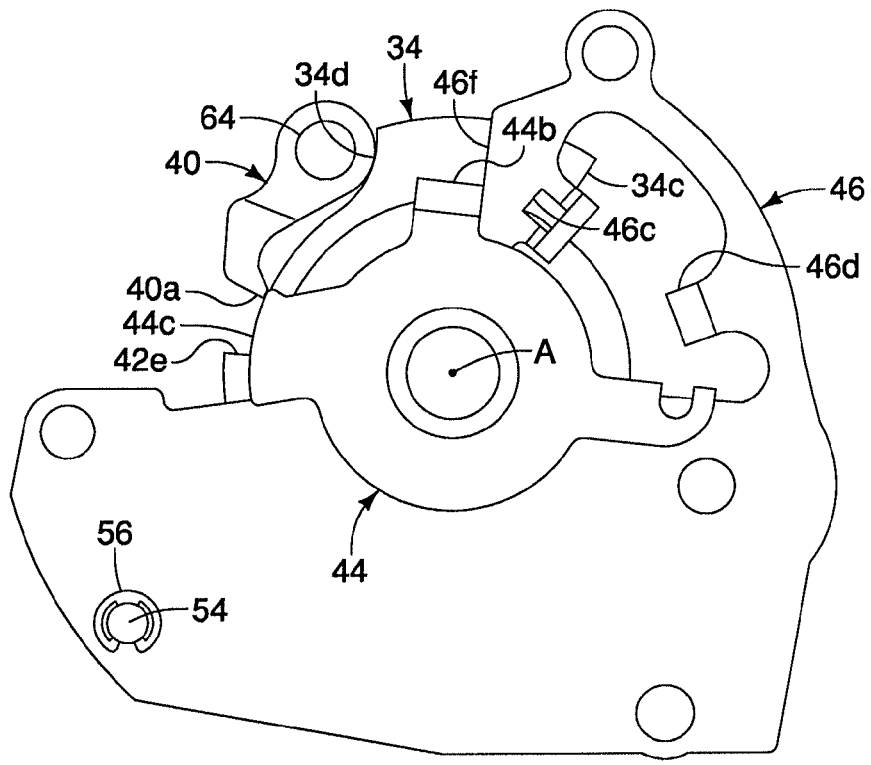
FIG. 15 is a bottom plan view of selected parts of the shifter illustrating the positioning ratchet member in the second shift position.

The first and second rotational stops 34c and 34d are formed on the peripheral edge of the positioning ratchet member 34 at two peripheral spaced locations. The first and second rotational stops 34c and 34d face in opposite rotational directions with respect to the pivot axis A. The first rotational stop 34c contacts the abutment 46d of the lower support plate 46 to stop further rotation of the positioning ratchet member 34 in the second (releasing) direction R2 against the urging force of the flat coil spring 74 as seen in FIG. 12. The second rotational stop 34d contacts the operating pawl 40 to stop rotational movement of the rider operating member 32 in the second rotational (releasing) direction R2 against the urging force of the return spring 60 as seen in FIG. 14.

The operating pawl abutment 34e and the positioning pawl abutment 34f are also formed on the peripheral edge of the positioning ratchet member 34 at two peripheral spaced locations. The operating pawl abutment 34e and the positioning pawl abutment 34f face in the same rotational directions with respect to the pivot axis A. The operating pawl abutment 34e is engaged by the operating pawl 40 in response to a winding operation of the rider operating member 32 for rotating the positioning ratchet member 34 in the first rotational direction R1 (i.e., an inner wire winding direction) about the pivot axis A, as seen in FIG. 10. Thus, the operating pawl abutment 34e constitutes a winding abutment that is engaged by the operating pawl 40 during the inner wire winding operation. The positioning pawl abutment 34f is engaged by the positioning pawl 38 to hold the positioning ratchet member 34 in the second shift position, as seen in FIG. 14. Thus, the positioning pawl abutment 34f constitutes a positioning abutment that is engaged by the positioning pawl 38 when the positioning pawl 38 is in a holding position.

Figure 2:
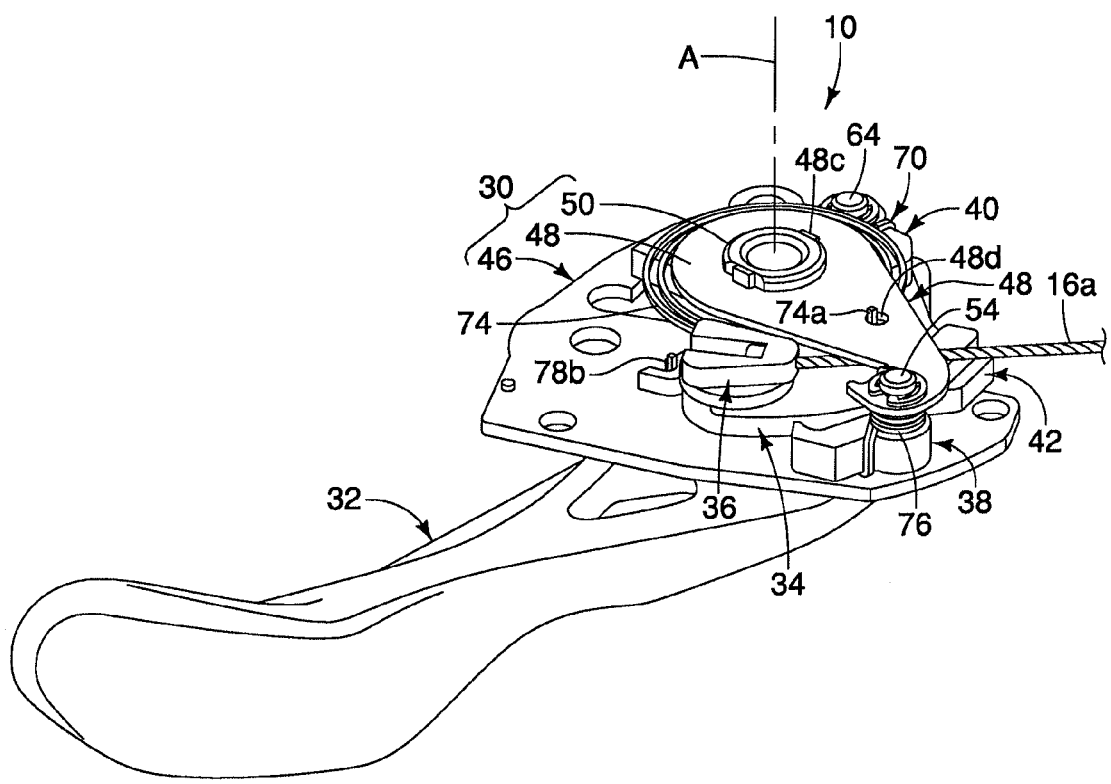
FIG. 2 is a perspective view of the shifter illustrated in FIG. 1, but with selected parts removed for illustrating the internal parts.
Figure 3:
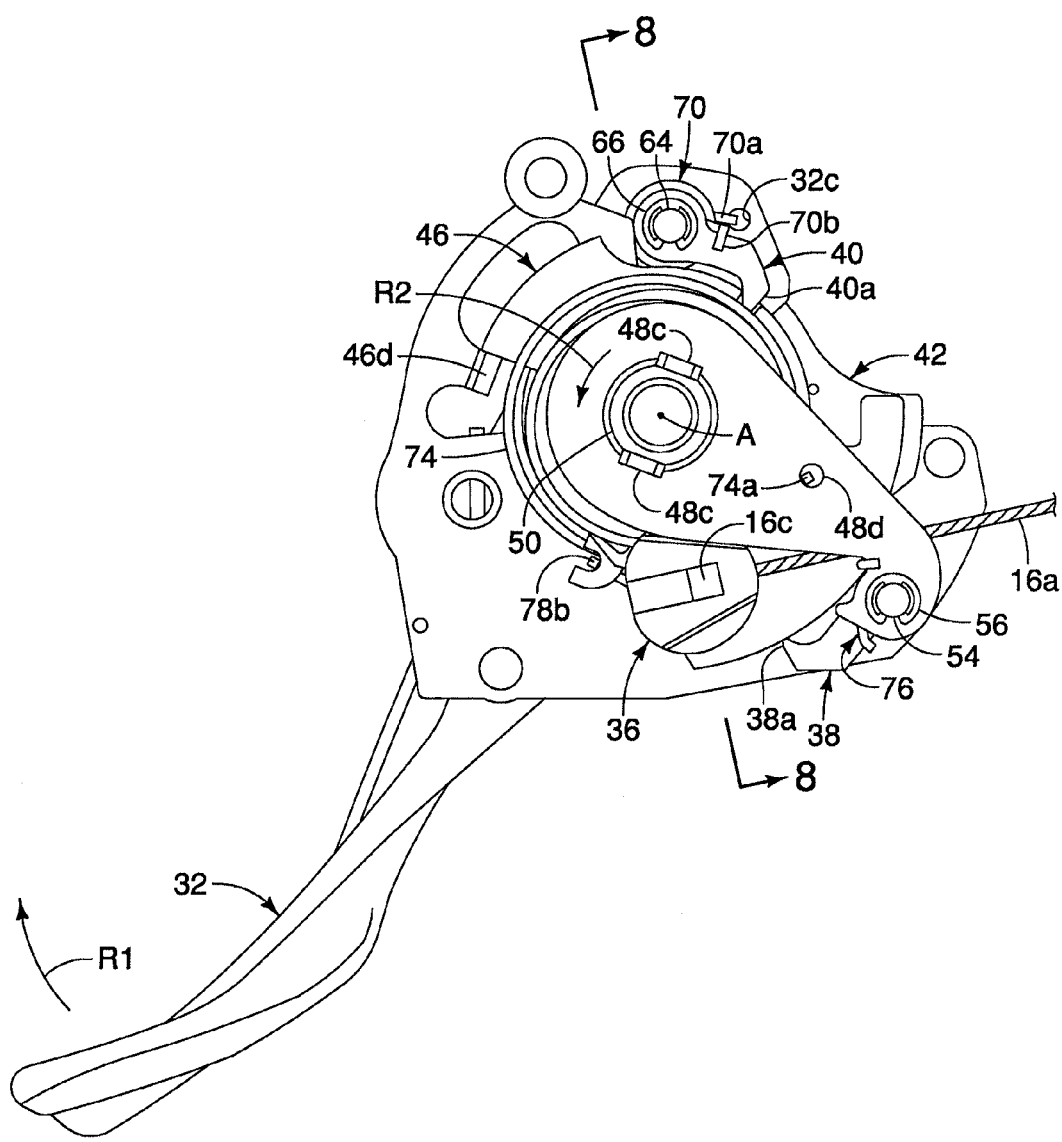
FIG. 3 is a top plan view of the selected parts of the shifter illustrated in FIGS. 1 and 2 with the rider operating member or lever in a rest position.
Figure 4:
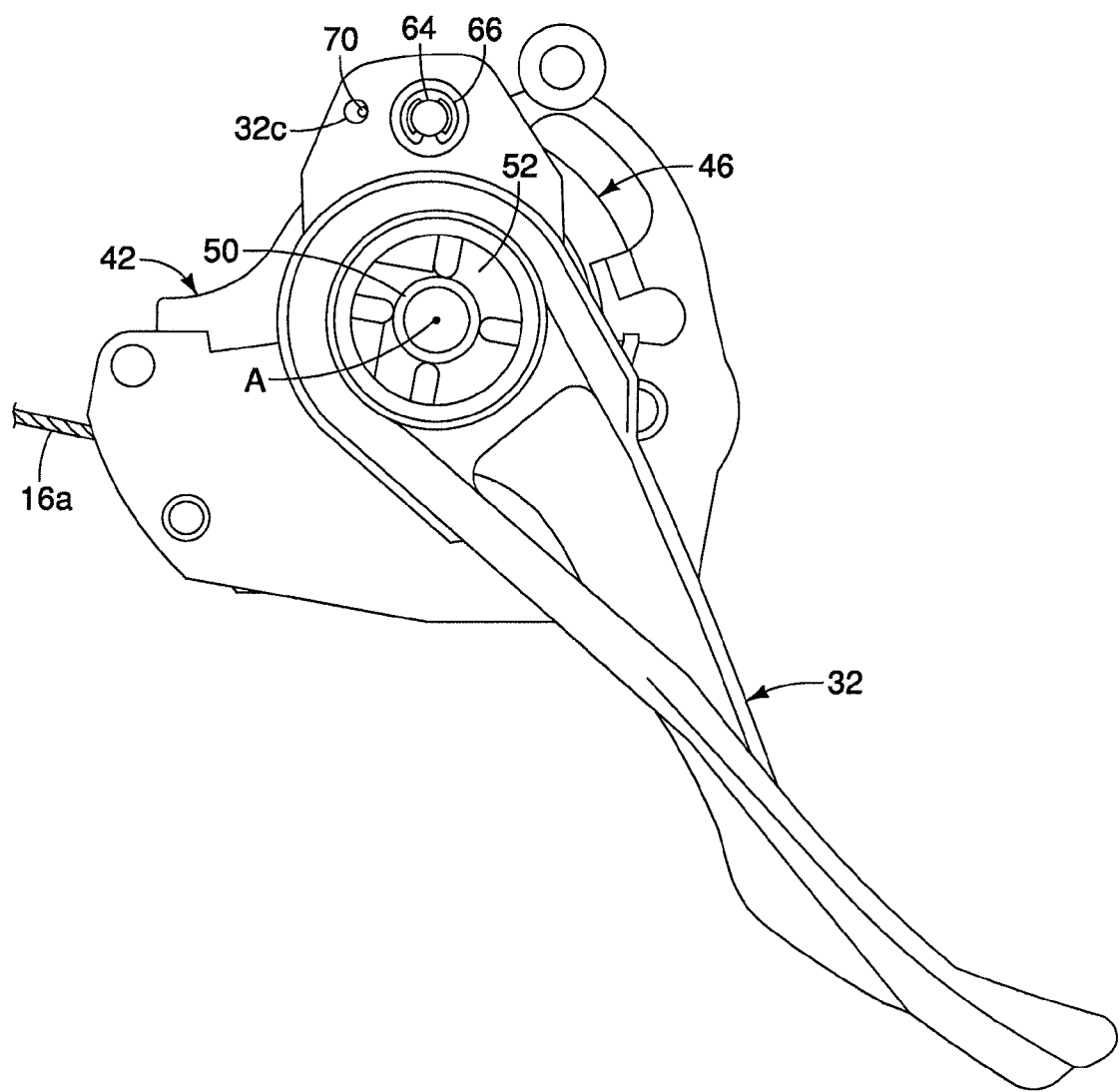
FIG. 4 is a bottom plan view of selected parts of the shifter illustrated in FIGS. 1 to 3 with the rider operating member or lever in a rest position.
Figure 5:
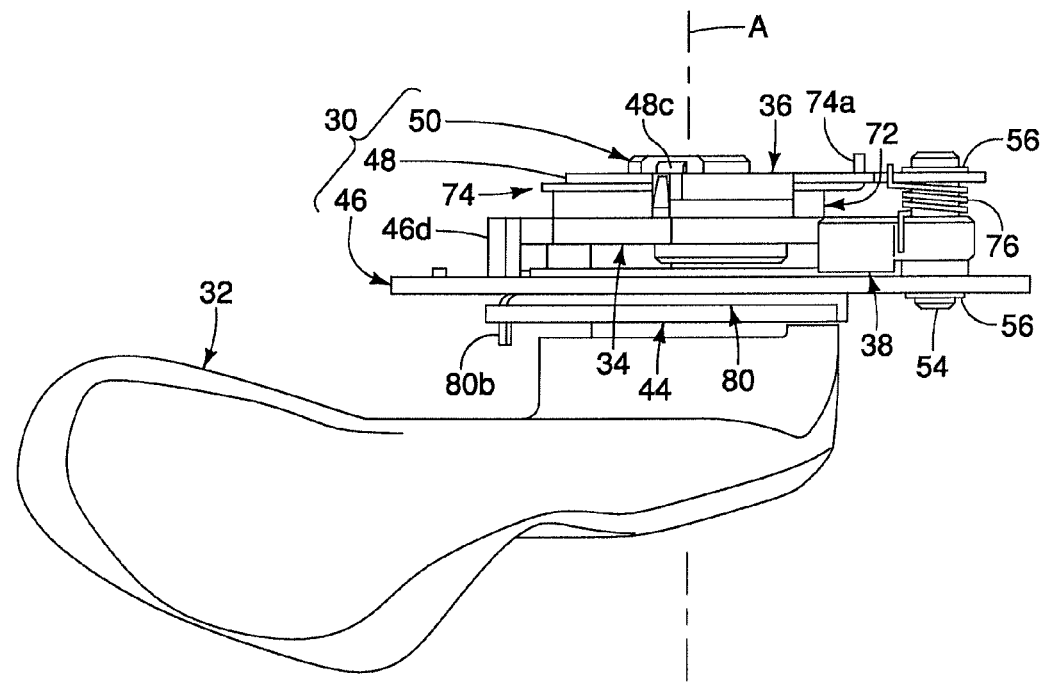
FIG. 5 is a rear side elevational view of selected parts of the shifter illustrated in FIGS. 1 to 4 with the rider operating member or lever in a rest position.
Figure 6:
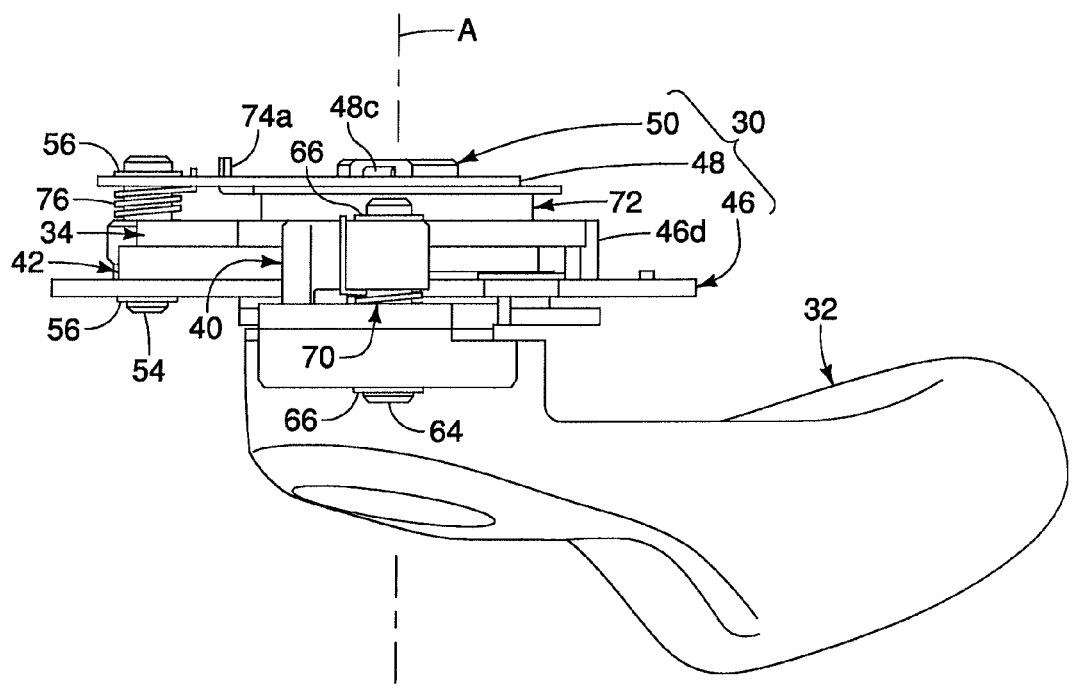
FIG. 6 is a front side elevational view of selected parts of the shifter illustrated in FIGS. 1 to 5 with the rider operating member or lever in a rest position.
Figure 7:
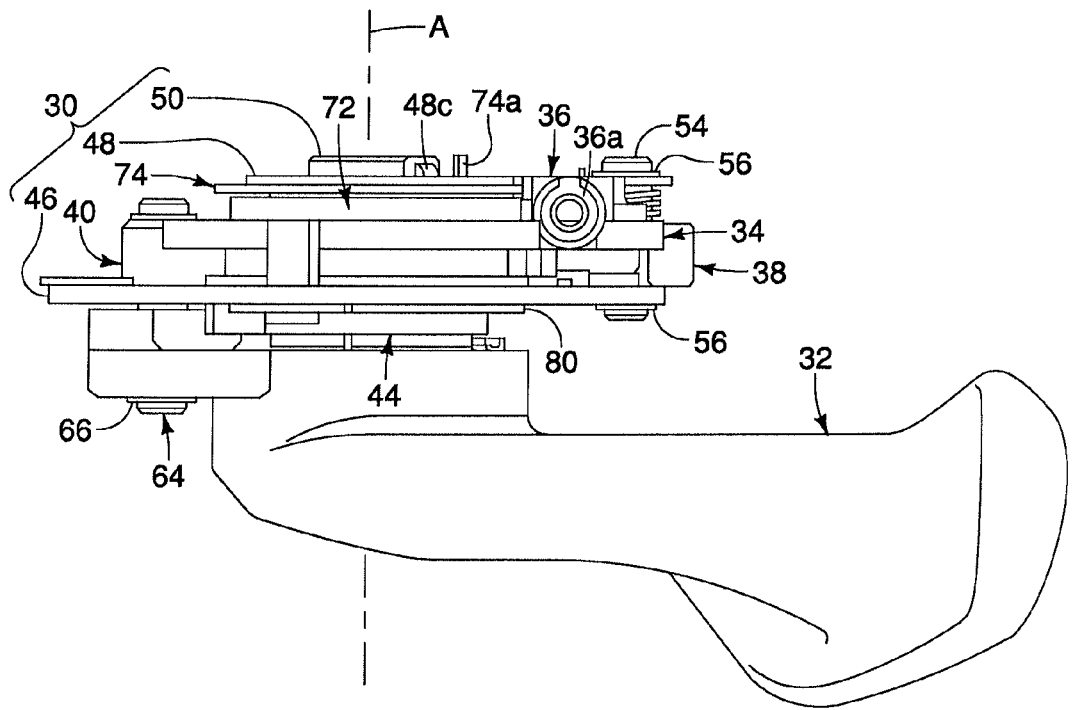
FIG. 7 is an outside elevational view of selected parts of the shifter illustrated in FIGS. 1 to 6 with the rider operating member or lever in a rest position.

Turning now to the structure of the wire takeup member 36. The wire takeup member 36 is a hard plastic or metal member that is attached to the inner wire 16a of the shift operating cable 16 for pull and releasing the inner wire 16a to perform a shifting operation. As seen in FIGS. 7 and 8, the wire takeup member 36 has a step shaped bore 36a that constitutes a wire attachment structure for attaching the nipple portion 16c of the shift operating cable 16 thereto. As seen in FIGS. 2, 3 and 8, the wire takeup member 36 is disposed in the cutout 34b of the positioning ratchet member 34 so that the positioning ratchet member 34 and the wire takeup member 36 move together about the pivot axis A.

Turning now to the structure of the positioning pawl 38, which is movably mounted with respect to the base member 30 between a holding position and a releasing position in response to an inner wire releasing operation of the operating pawl 40. In particular, the positioning pawl 38 prevents rotation of the positioning ratchet member 34 in the second rotational direction R2 (i.e., the inner wire releasing direction) about the pivot axis A when the positioning pawl 38 is in the holding position. On the other hand, the positioning pawl 38 releases the positioning ratchet member 34 for rotation in the second rotational direction R2 (i.e., the inner wire releasing direction) when the positioning pawl 38 is in the releasing position.

As mentioned above, the positioning pawl 38 is pivotally mounted on the pivot pin 54 of the lower support plate 46. Thus, the positioning pawl 38 is pivotally mounted with respect to the base member 30 about a pivot axis that is offset from the pivot axis A of the positioning ratchet member 34. As seen in FIG. 11, the positioning pawl 38 is movably mounted with respect to the base member 30 from a holding position (steps A and B of FIG. 11) to a releasing position (steps C and D of FIG. 11) in response to an inner wire releasing operation of the rider operating member 32. A torsion spring 76 is provided on the pivot pin 54 to bias the positioning pawl 38 into contact with the peripheral edge of the positioning ratchet member 34. The coiled portion of the spring 76 is provided on the pivot pin 54. A first leg portion of the spring 76 hooks onto the upper plate 48, while a second leg portion of the spring 76 hooks onto the positioning pawl 38.

The positioning pawl 38 has a positioning tooth or abutment 38a that engages the positioning pawl abutment 34f of the positioning ratchet member 34 when the positioning ratchet member 34 is in the second shift position and the positioning pawl 38 is the holding position (FIG. 14). The positioning pawl 38 prevents rotation of the positioning ratchet member 34 in the second rotational direction R2 (i.e., the inner wire releasing direction) about the pivot axis A when the positioning tooth 38a of the positioning pawl 38 engages the positioning pawl abutment 34f of the positioning ratchet member 34 (i.e., the positioning pawl 38 is in the holding position). The positioning pawl 38 releases the positioning ratchet member 34 for rotation in the second rotational direction R2 (i.e., the inner wire releasing direction) when the positioning tooth 38a of the positioning pawl 38 is disengaged from the positioning pawl abutment 34f of the positioning ratchet member 34 by the release member 42 (i.e., the positioning pawl 38 moved to the releasing position by the release member 42).

Turning now to the structure of the operating pawl 40, which is movably mounted with respect to the base member 30. The operating pawl 40 operatively engages and moves the positioning ratchet member 34 during an inner wire winding operation. The operating pawl 40 operatively engages and moves the release member 42 during an inner wire releasing operation. As mentioned above, the operating pawl 40 is pivotally mounted on the pivot pin 64 of the rider operating member 32. Thus, the operating pawl 40 is pivotally mounted with respect to the base member 30 about a pivot axis that is offset from the pivot axis A of the positioning ratchet member 34. The operating pawl 40 has an engagement abutment or tooth 40a that engages the operating pawl abutment 34e of the positioning ratchet member 34 to rotate the positioning ratchet member 34 in the first rotational direction R1 (i.e., an inner wire winding direction) about the pivot axis A when the operating pawl 40 is moved with respect to the base member 30 in response to an inner wire winding operation of the rider operating member 32. In other words, the operating pawl 40 engages and rotates the positioning ratchet member 34 in a winding direction about the pivot axis in response to a winding operation of the operating pawl 40.

When the positioning ratchet member 34 is in the second shift position, the engagement abutment or tooth 40a of the operating pawl 40 contacts a peripheral edge of the control member 44, which holds the operating pawl 40 out of engagement with the operating pawl abutment 34e of the positioning ratchet member 34, such that the inner wire releasing operation can be performed by moving the rider operating member 32 in the first rotational direction R1 (i.e., an inner wire winding direction) about the pivot axis A. During this inner wire releasing operation of the rider operating member 32, the operating pawl 40 operatively engages and moves the release member 42, which moves the positioning pawl 38 from the holding position to the releasing position in response to the releasing operation of the operating pawl 40. In particular, this movement of the release member 42 pivots the positioning pawl 38 to the releasing position such that the engagement abutment or tooth 38a disengages from the positioning pawl abutment 34f of the positioning ratchet member 34. With the positioning pawl 38 in the releasing position, the positioning ratchet member 34 rotates in the second rotational direction R2 (i.e., an inner wire releasing direction) about the pivot axis A under the urging force of the flat coil spring 74.

Turning now to the structure of the release member 42, which is movably mounted with respect to the base member 30. The release member 42 is a flat, rigid plate that is made of a suitable material such as metal. In the illustrated embodiment, as seen in FIG. 9, the release member 42 includes a mounting hole 42a and a pawl engagement part 42b. The release member 42 moves the positioning pawl 38 from the holding position to the releasing position in response to the releasing operation of the operating pawl 40. A flat coil spring 78 is operatively coupled between the release member 42 and the lower support plate 46 to bias the release member 42 in the second rotational direction R2. The spring 78 has a first end 78a disposed in a hole 46e in the lower support plate 46 and a second end 78b hooked onto the release member 42. Thus, the spring 78 biases the release member 42 towards a rest position (steps A of FIGS. 10 an 11).

As best seen in FIGS. 16 to 20, the mounting hole 42a has a pair of control cutouts 42c receives the abutments 72d of the spring retainer 72 to provide for a limited amount of rotational movement of the release member 42 with respect to the positioning ratchet member 34. The cutouts 42c are larger than the abutments 72d of the spring retainer 72 such that the release member 42 can rotate relative to the spring retainer 72 and the positioning ratchet member 34, which is fixed to rotate with the spring retainer 72 by the abutments 72d of the spring retainer 72. The peripheral edge of the release member 42 has a winding abutment 42d and a release abutment 42e, which are selectively engaged by the operating pawl 40. When the positioning ratchet member 34 is in the first shift position, the operating pawl abutment 34e of the positioning ratchet member 34 and the winding abutment 42d of the release member 42 are aligned. Thus, during an inner wire winding operation, the operating pawl 40 contacts both the operating pawl abutment 34e of the positioning ratchet member 34 and the winding abutment 42d of the release member 42 so that the positioning ratchet member 34 and the release member 42 rotate together. When the positioning ratchet member 34 is in the second shift position, the control member 44 prevents the operating pawl 40 from engaging the operating pawl abutment 34e of the positioning ratchet member 34 and the winding abutment 42d of the release member 42. Rather, the control member 44 holds the operating pawl 40 at radially outward position with respect to the abutment 34e and 42d such that the operating pawl 40 engages the release abutment 42e of the release member 42. In other words, during an inner wire releasing operation, the release member 42 is rotated relative to the positioning ratchet member 34 by the operating pawl 40 engaging the release abutment 42e of the release member 42. The amount of rotational movement of the release member 42 is rotated relative to the positioning ratchet member 34 is limited by the angular dimension of the cutouts 42c. In other words, after a prescribed amount of rotational movement of the release member 42, the ends of the cutouts 42c contact the abutments 72d of the spring retainer 72 to prevent any further relative rotational movement between the release member 42 and the positioning ratchet member 34.

Accordingly, during an inner wire releasing operation, the operating pawl 40 engages the release abutment 42e of the release member 42 to move the release member 42 with respect to the positioning ratchet member 34, which remains stationary until the pawl engagement part 42b of the release member 42 contacts and pivots the positioning pawl 38 to the disengaged or non-holding position with respect to the positioning ratchet member 34. Once the positioning pawl 38 is the disengaged from the positioning ratchet member 34, the positioning ratchet member 34 moves with the spring retainer 72 back to its first rest position under the urging force of the flat coil spring 74.

Turning now to the structure of the control member 44, which is movably mounted with respect to the base member 30 between a first control position and a second control position. The second control position is angularly spaced from the first control position about the pivot axis A. The operating pawl 40 engages and rotates the control member 44 in the winding direction from the first control position to the second control position about the pivot axis A in response to the winding operation of the operating pawl 40. In other words, when the positioning ratchet member 34 is in the first shift position, the positioning pawl 38 does not hold the positioning ratchet member 34 (i.e., the non-holding position) and movement of the operating pawl 40 in the first rotational direction R1 (i.e., an inner wire winding direction) causes the operating pawl 40 to engage and rotate the control member 44 in the first rotational direction R1 from the first control position to the second control position. More specifically as shown in FIG. 10, the operating pawl 40 engages and rotates the control member 44 in the first rotational direction from the position shown in step B to the position shown in step C before the control member 44 starts to return to its rest position by rotating in the second rotational direction (as indicated by the small arrow on the control member 44) to the position shown in step D. At this rest position shown in step D, the control member 44 holds the operating pawl 40 out of engagement with the positioning ratchet member 34. On the other hand, when the positioning ratchet member 34 is in the second shift position, the operating pawl 40 does not rotate the control member 44 in the winding direction from the first control position to the second control position about the pivot axis A in response to the releasing operation of the operating pawl 40. Rather, when the positioning ratchet member 34 in the second shift position, the operating pawl 40 is in the second rest position such that the engagement abutment or tooth 40a of the operating pawl 40 contacts a peripheral edge of the control member 44, which holds the operating pawl 40 out of engagement with the operating pawl abutment 34e of the positioning ratchet member 34. Thus, the inner wire releasing operation can be performed by moving the rider operating member 32 in the first rotational direction R1 (i.e., an inner wire winding direction) about the pivot axis A without moving the positioning ratchet member 34 or the control member 44.

The control member 44 is a flat, rigid plate that is made of a suitable material such as metal. In the illustrated embodiment, the control member 44 includes a mounting hole 44a, a stop 44b and an operating pawl engagement part 44c. When the control member 44 is in the first control position, the engagement abutment or tooth 40a of the operating pawl 40 is engaged with the operating pawl abutment 34e of the positioning ratchet member 34 so that the operating pawl 40 rotate the positioning ratchet member 34 in the first rotational direction R1 (i.e., an inner wire winding direction) in response to an inner wire winding operation of the rider operating member 32.

When the control member 44 is in the second control position, the operating pawl engagement part 44c of the control member 44 operatively prevents (i.e., blocks) the engagement abutment or tooth 40a of the operating pawl 40 from engaging the operating pawl abutment 34e of the positioning ratchet member 34. In other words, the operating pawl engagement part 44c of the control member 44 engages and holds the engagement abutment or tooth 40a of the operating pawl 40 in a disengaged position with respect to the operating pawl abutment 34e of the positioning ratchet member 34 when the control member 44 is in the second control position. Thus, the operating pawl engagement part 44c of the control member 44 operatively prevents the operating pawl 40 from rotating the positioning ratchet member 34 during the releasing operation of the operating pawl 40 while the control member 44 is disposed in the first control position. The control member 44 is biased to the first control position, which is a rest position, and mounted on the pivot axis of the positioning ratchet member 34. Preferably, a flat coil spring 80 is operatively coupled between the control member 44 and the lower support plate 46 to bias the control member 44 in the second rotational direction R2. The spring 80 has a first end 80a hooked onto the lower support plate 46 and a second end 80b hooked onto the control member 44. Thus, the spring 80 biases the control member 44 towards the first control position (steps A of FIGS. 10 and 11) in which the stop 44b of the control member 44 contacts the abutment 46d of the lower support plate 46 for preventing further rotation of the control member 44 in the second rotational direction R2.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the following directional terms "forward", "rearward", "above", "downward", "vertical", "horizontal", "below" and "transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle component operating device comprising:
a housing;
a base member;
an operating pawl movably mounted with respect to the base member;
a positioning ratchet member rotatably mounted with respect to the base member about a pivot axis, with the operating pawl engaging and rotating the positioning ratchet member in a winding direction about the pivot axis in response to a winding operation of the operating pawl;
a positioning pawl movably mounted with respect to the base member between a holding position and a releasing position, with the positioning pawl preventing rotation of the positioning ratchet member in a release direction about the pivot axis when the positioning pawl is in the holding position, and the positioning pawl releasing die positioning ratchet member for rotation in the release direction when the positioning pawl is in the releasing position;
a release member movably mounted with respect to the base member, with the release member moving the positioning pawl from the holding position to the releasing position in response to a releasing operation of the operating pawl; and
a control member disposed completely within the housing and movably mounted with respect to the base member between a first position and a second position, with the control member operatively preventing the operating pawl from rotating the positioning ratchet member during the releasing operation of the operating pawl while the control member is disposed in the first position, wherein the operating pawl operatively contacts and rotates the control member, the positioning ratchet member, and the release member in the winding direction during the winding operation.

2. The bicycle component operating device according to claim 1, wherein
the positioning ratchet member includes an inner wire connection structure.

3. The bicycle component operating device according to claim 1, further comprising
a rider operating member movably mounted with respect to the base member, with the operating pawl mounted on the rider operating member to move therewith.

4. The bicycle component operating device according to claim 3, wherein
the operating pawl is pivotally mounted on the rider operating member.

5. The bicycle component operating device according to claim 4, wherein
the rider operating member is pivotally mounted on the pivot axis of the positioning ratchet member.

6. The bicycle component operating device according to claim 3, wherein
the rider operating member is a single trigger lever that is biased to a rest position and movably mounted with respect to the base member in the winding direction from the rest position to an operating position in a single progressive stroke.

7. The bicycle component operating device according to claim 1, wherein
the operating pawl operatively engages and moves the release member, which moves the positioning pawl from the holding position to the releasing position in response to the releasing operation of the operating pawl.

8. The bicycle component operating device according to claim 1, wherein
the positioning pawl is pivotally mounted with respect to the base member about a pivot axis that is offset from the pivot axis of the positioning ratchet member.

9. The bicycle component operating device according to claim 1, wherein
the positioning ratchet member includes at least one positioning abutment that is engaged by the positioning pawl when the positioning pawl is in the holding position and at least one winding abutment that is engaged by the operating pawl during the winding operation.

10. The bicycle component operating device according to claim 9, wherein
the control member prevents the operating pawl from moving into engagement with the winding abutment during the releasing operation of the operating pawl while the positioning pawl is in the holding position.

11. The bicycle component operating device according to claim 1, wherein
the control member is biased to the first position and mounted on the pivot axis of the positioning ratchet member.

12. A bicycle component operating device comprising:
a housing;
a base member;
an operating pawl movably mounted with respect to the base member;
a positioning ratchet member rotatably mounted with respect to the base member about a pivot axis, with the operating pawl engaging and rotating the positioning ratchet member in a winding direction about the pivot axis in response to a winding operation of the operating pawl;
a positioning pawl movably mounted with respect to the base member between a holding position and a releasing position, with the positioning pawl preventing rotation of the positioning ratchet member in a release direction about the pivot axis when the positioning pawl is in the holding position, and the positioning pawl releasing the positioning ratchet member for rotation in the release direction when the positioning pawl is in the releasing position;
a release member movably mounted with respect to the base member, with the release member moving the positioning pawl from the holding position to the releasing position in response to a releasing operation of the operating pawl; and
a control member disposed completely within the housing and movably mounted with respect to the base member between a first position and a second position with the control member operatively preventing the operating pawl from rotating the positioning ratchet member during the releasing operation of the operating pawl while the control member is disposed in the first position,
the control member being biased towards the first position, which is a rest position.

13. The bicycle component operating device according to claim 1, wherein
the operating pawl contacts the control member, which holds the operating pawl out of engagement with the positioning ratchet member to perform the releasing operation when the rider operating member is moved in the winding direction while the positioning pawl is in the holding position.

14. The bicycle component operating device according to claim 1, wherein
the operating pawl is spaced radially outward of the positioning ratchet member with respect to the pivot axis with the positioning ratchet member being disposed in a rest position corresponding to the first position of the control member.

15. A bicycle component operating device comprising:
a housing;
a base member;
an operating pawl movably mounted with respect to the base member;
a positioning ratchet member rotatably mounted with respect to the base member about a pivot axis, with the operating pawl engaging and rotating the positioning ratchet member in a winding direction about the pivot axis in response to a winding operation of the operating pawl;
a positioning pawl movably mounted with respect to the base member between a holding position and a releasing position, with the positioning pawl preventing rotation of the positioning ratchet member in a release direction about the pivot axis when the positioning pawl is in the holding position, and the positioning pawl releasing the positioning ratchet member for rotation in the release direction when the positioning pawl is in the releasing position;
a release member movably mounted with respect to the base member, with the release member moving the positioning pawl from the holding position to the releasing position in response to a releasing operation of the operating pawl; and
a control member disposed completely within the housing and movably mounted with respect to the base member between a first position and a second position, with the control member operatively preventing the operating pawl from rotating the positioning ratchet member during the releasing operation of the operating pawl while the control member is disposed in the first position,
the control member pivoting on the pivot axis of the positioning ratchet member through a single progressive stroke from the first position to the second position during the releasing operation.

16. The bicycle component operating device according to claim 1, wherein
the operating pawl operatively contacts and rotates the positioning ratchet member and the release member such that the positioning ratchet member and the release member rotate together in the winding direction during the winding operation.

17. The bicycle component operating device according to claim 3, wherein
the rider operating member moves in a single rotational direction from a rest position to an operating position to perform both the winding and releasing operations.

* * * * *